US010838645B2

(12) United States Patent
Basu et al.

(10) Patent No.: US 10,838,645 B2
(45) Date of Patent: Nov. 17, 2020

(54) MEMORY WRITING OPERATIONS WITH CONSIDERATION FOR THERMAL THRESHOLDS

(71) Applicant: Micron Technology, Inc., Boise, ID (US)

(72) Inventors: Reshmi Basu, Boise, ID (US); William Leins Stube, II, Lafayette, CO (US); Anthony Joseph Dupont, Appleton, WI (US); Michael Richard Ives, Hortonville, WI (US)

(73) Assignee: Micron Technology, Inc., Boise, ID (US)

( * ) Notice: Subject to any disclaimer, the term of this patent is extended or adjusted under 35 U.S.C. 154(b) by 24 days.

(21) Appl. No.: 16/390,856

(22) Filed: Apr. 22, 2019

(65) Prior Publication Data

US 2020/0333974 A1 Oct. 22, 2020

(51) Int. Cl.
*G06F 3/06* (2006.01)
*G06F 11/30* (2006.01)

(52) U.S. Cl.
CPC .......... *G06F 3/0644* (2013.01); *G06F 3/0619* (2013.01); *G06F 3/0631* (2013.01); *G06F 3/0683* (2013.01); *G06F 11/3037* (2013.01); *G06F 11/3058* (2013.01)

(58) Field of Classification Search
None
See application file for complete search history.

(56) References Cited

U.S. PATENT DOCUMENTS

| 2017/0255403 A1* | 9/2017 | Sharon ................ G11C 11/5642 |
| 2018/0121131 A1* | 5/2018 | Vogan .................... G06F 3/0679 |
| 2018/0246794 A1* | 8/2018 | Baty ....................... G11C 29/00 |
| 2019/0278510 A1* | 9/2019 | Kaynak ................. G06F 3/0659 |

* cited by examiner

*Primary Examiner* — Denise Tran
(74) *Attorney, Agent, or Firm* — Fletcher Yoder, P.C.

(57) ABSTRACT

Generally, a computing system includes processing circuitry, such as one or more processors or other suitable components, and memory devices, such as chips or integrated circuits. The memory devices may be associated with thermal limits. Saving data in such a way that causes a thermal limit of the memory device to be exceeded may cause loss of stored data and/or device over-heating. As discussed herein, a memory controller associated with the processing circuitry may determine whether a thermal limit is expected to be exceeded for a current memory writing operation. When the thermal limit is expected to be exceeded, the memory controller may respond by modifying the memory operation in such a manner that the thermal limit is not exceeded, thereby improving operation of at least the memory device and/or memory controller.

15 Claims, 5 Drawing Sheets

MEMORY WRITING OPERATIONS WITH CONSIDERATION FOR THERMAL THRESHOLDS

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

Generally, a computing system includes processing circuitry, such as one or more processors or other suitable components, and memory devices, such as chips or integrated circuits. One or more memory devices may be implemented on a memory module, such as a dual in-line memory module (DINM), to store data accessible to the processing circuitry. For example, based on a user input to the computing system, the processing circuitry may request that a memory module retrieve data corresponding to the user input from its memory devices. In some instances, the retrieved data may include instructions executable by the processing circuitry to perform an operation and/or may include data to be used as an input for the operation. In addition, in some cases, data output from the operation may be stored in memory, for example, to enable subsequent retrieval. However, the memory devices may be associated with thermal limits. Saving data in such a way that causes a thermal limit of the memory device to be exceeded may cause loss of stored data, device over-heating, lower performance of the memory and/or system, or the like.

BRIEF DESCRIPTION OF THE DRAWINGS

Various aspects of this disclosure may be better understood upon reading the following detailed description and upon reference to the drawings in which.

DETAILED DESCRIPTION

Figure 1:
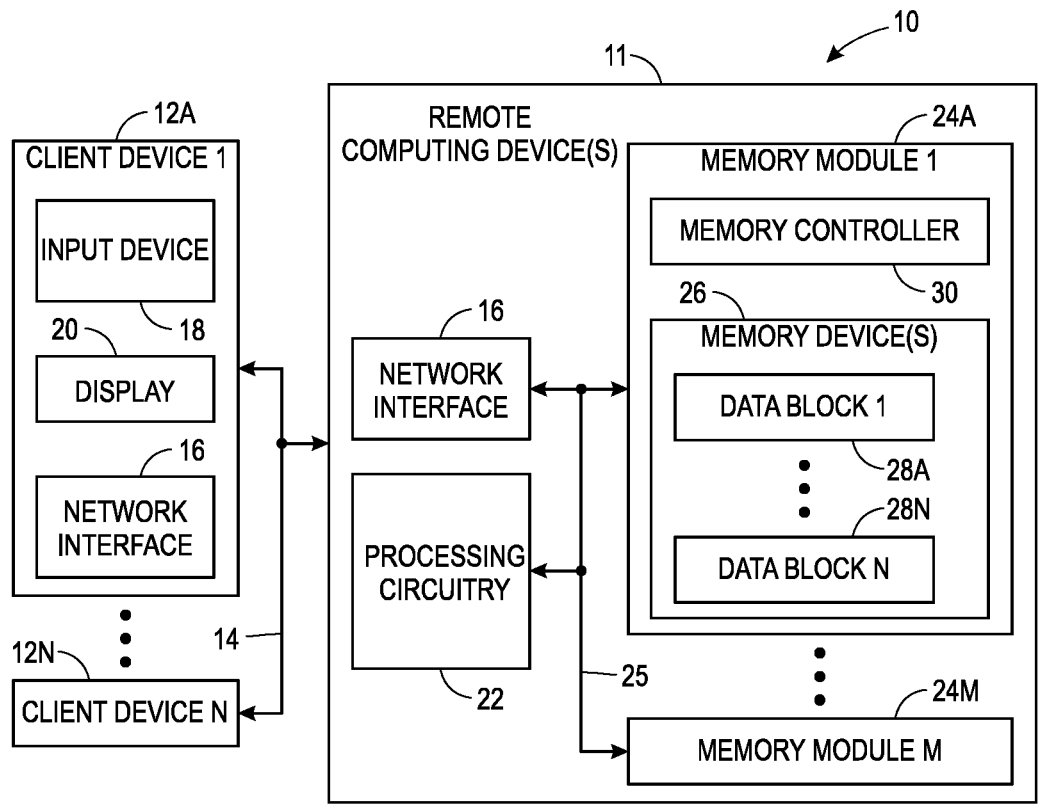
FIG. 1 is a block diagram of a computing system that includes client devices and one or more remote computing devices, in accordance with an embodiment.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally, hardware of a computing system includes processing circuitry and memory, for example, implemented using one or more processors and/or one or more memory devices (e.g., chips or integrated circuits). During operation of the computing system, the processing circuitry may perform various operations (e.g., tasks) by executing corresponding instructions, for example, based on a user input to determine output data by performing operations on input data. To facilitate operation of the computing system, data accessible to the processing circuitry may be stored in a memory device, such that the memory device stores the input data, the output data, data indicating the executable instructions, or any combination thereof.

Additionally, in some instances, memory devices may be implemented using different memory types. For example, a memory device may be implemented as volatile memory, such as dynamic random-access memory (DRAM) or static random-access memory (SRAM).

Alternatively, the memory device may be implemented as non-volatile memory, such as flash (e.g., NAND, NOR) memory, phase-change memory (e.g., 3D XPoint™), or ferroelectric random access memory (FeRAM). In any case, memory devices generally include at least one memory die (e.g., an array of memory cells configured on a portion or "die" of a semiconductor wafer) to store data bits (e.g., "0" bit or "1" bit) transmitted to the memory device through a channel (e.g., data channel, communicative coupling, bus interface) and may be functionally similar from the perspective of the processing circuitry even when the memory devices include different memory types.

Data bits may be stored within a corresponding memory device. Some memory devices of the memory module may include one or more memory die. When the processing circuitry operates to store the data bits within the one or more memory die, sometimes thermal limits of a respective memory die are exceeded. The thermal limits may correspond to material properties of the memory die and/or may correspond to or otherwise be affected by other limit-determining characteristics such as operating temperature of the system, airflow through the system, or the like. These material properties may dictate, at least in part, a maximum number of writing operations that may occur before the memory die becomes too hot and thus may define and/or correspond to the thermal limit. Processing circuitry writing too much data to a memory die such that a thermal limit is exceeded (e.g., data beyond a thermal limit of partitions, where a partition is portion of a memory device used to store data, where a memory device may include a suitable number of partitions, as will be appreciated) may over-heat the memory die. As discussed herein, a memory controller associated with the processing circuitry may determine whether a thermal limit is going to be exceeded for a current writing memory operation. When the thermal limit is expected to be exceeded, the memory controller may respond by modifying the memory operation in such a manner that the thermal limit is not exceeded. Operating in such a manner may mitigate effects of exceeding the thermal limit, which include impacting processing circuit as to delay processing, reducing bandwidth and/or efficiency of the memory device and/or memory system, or the like.

As described herein, the memory controller may determine that a particular command is associated with writing data to a particular number of data partitions of the memory die, where the process of writing data to that number of partitions may exceed a thermal limit of the memory die. The memory controller, in response to determining that the thermal limit is expected to be exceeded, may adjust the particular command such that the data to be written is spread across partitions of additional memory die of a same memory device. In this way, each thermal limit of each memory die may not be exceeded during completion of the particular writing command.

To help illustrate, FIG. 1 depicts an example of a computing system 10, which includes one or more remote computing devices 11. As in the depicted embodiment, the remote computing devices 11 may be communicatively coupled to the one or more client devices 12 via a communication network 14. It should be appreciated that the depicted embodiment is merely intended to be illustrative and not limiting. For example, in other embodiments, the remote computing devices 11 may be communicatively coupled to a single client device 12 or more than two client devices 12. Furthermore, depending on the computing system 10, the memory controller 30 may not be just on the memory module 24. In this way, depicted is a generic use of the described techniques where the memory controller 30 is wholly on the memory module 24. However, other examples may include a memory controller without a memory module and/or may use processing circuit 22 as the memory controller 30.

In any case, the communication network 14 may enable data communication between the client devices 12 and the remote computing devices 11. In some embodiments, the client devices 12 may be physically remote (e.g., separate) from the remote computing devices 11, for example, such that the remote computing devices 11 are located at a centralized data center. Thus, in some embodiments, the communication network 14 may be a wide area network (WAN), such as the Internet. To facilitate communication via the communication network 14, the remote computing devices 11 and the client devices 12 may each include a network interface 16.

In addition to the network interface 16, a client device 12 may include input devices 18 and/or an electronic display 20 to enable a user to interact with the client device 12. For example, the input devices 18 may receive user inputs and, thus, may include buttons, keyboards, mice, trackpads, and/or the like. Additionally or alternatively, the electronic display 20 may include touch sensing components that receive user inputs by detecting occurrence and/or position of an object touching its screen (e.g., surface of the electronic display 20). In addition to enabling user inputs, the electronic display 20 may facilitate providing visual representations of information by displaying a graphical user interface (GUI) of an operating system, an application interface, text, a still image, video content, or the like.

As described above, the communication network 14 may enable data communication between the remote computing devices 11 and one or more client devices 12. In other words, the communication network 14 may enable user inputs to be communicated from a client device 12 to a remote computing device 11. Additionally or alternatively, the communication network 14 may enable results of operations performed by the remote computing device 11 based on the user inputs to be communicated back to the client device 12, for example, as image data to be displayed on its electronic display 20.

In fact, in some embodiments, data communication provided by the communication network 14 may be leveraged to make centralized hardware available to multiple users, such that hardware at client devices 12 may be reduced. For example, the remote computing devices 11 may provide data storage for multiple different client devices 12, thereby enabling data storage (e.g., memory) provided locally at the client devices 12 to be reduced. Additionally or alternatively, the remote computing devices 11 may provide processing for multiple different client devices 12, thereby enabling processing power provided locally at the client devices 12 to be reduced.

Thus, in addition to the network interface 16, the remote computing devices 11 may include processing circuitry 22 and one or more memory modules 24 (e.g., sub-systems) communicatively coupled via a data bus 25. In some embodiments, the processing circuitry 22 and/or the memory modules 24 may be implemented across multiple remote computing devices 11, for example, such that a first remote computing device 11 includes a portion of the processing circuitry 22 and the first memory module 24A, while an Mth remote computing device 11 includes another portion of the processing circuitry 22 and the Mth memory module 24M. Additionally or alternatively, the processing circuitry 22 and the memory modules 24 may be implemented in a single remote computing device 11.

In any case, the processing circuitry 22 may generally execute instructions to perform operations, for example, indicated by user inputs received from a client device 12. Thus, the processing circuitry 22 may include one or more central processing units (CPUs), one or more graphics processing units (GPUs), one or more processor cores, or any combination thereof. In some embodiments, the processing circuitry 22 may additionally perform operations based on circuit connections formed (e.g., programmed) in the processing circuitry 22. Thus, in such embodiments, the processing circuitry 22 may additionally include one or more application specific integrated circuits (ASICs), one or more field programmable logic arrays (FPGAs), or any combination of suitable processing devices.

Additionally, a memory module 24 may provide data storage accessible to the processing circuitry 22. For example, a memory module 24 may store data received from a client device 12, data resulting from an operation performed by the processing circuitry 22, data to be input to the operation performed by the processing circuitry 22, instructions executable by the processing circuitry 22 to perform the operation, or any combination thereof. To facilitate providing data storage, a memory module 24 may include one or more memory devices 26 (e.g., chips or integrated circuits). In other words, the memory devices 26 may each include a tangible, non-transitory, computer-readable medium that stores data accessible to the processing circuitry 22.

Since hardware of the remote computing devices 11 may be utilized by multiple client devices 12, at least in some instances, a memory module 24 may store data corresponding to different client devices 12. In some embodiments, the data may be grouped and stored as data blocks 28. In fact, in some embodiments, data corresponding with each client device 12 may be stored as a separate data block 28. For example, the memory devices 26 in the first memory module 24A may store a first data block 28A corresponding with the first client device 12A and an Nth data block 28N corresponding with the Nth client device 12N. One or more data blocks 28 may be stored within a memory die of the memory device 26.

Additionally or alternatively, in some embodiments, a data block 28 may correspond to a virtual machine (VM) provided to a client device 12. In other words, as an illustrative example, a remote computing device 11 may provide the first client device 12A a first virtual machine via the first data block 28A and provide the Nth client device 12N an Nth virtual machine via the Nth data block 28N. Thus, when the first client device 12A receives user inputs intended for the first virtual machine, the first client device 12A may communicate the user inputs to the remote computing devices 11 via the communication network 14. Based at least in part on the user inputs, the remote computing device 11 may retrieve the first data block 28A, execute instructions to perform corresponding operations, and communicate the results of the operations back to the first client device 12A via the communication network 14.

Similarly, when the Nth client device 12N receives user inputs intended for the Nth virtual machine, the Nth client device 12N may communicate the user inputs to the remote computing devices 11 via the communication network 14. Based at least in part on the user inputs, the remote computing device 11 may retrieve the Nth data block 28N, execute instructions to perform corresponding operations, and communicate the results of the operations back to the Nth client device 12N via the communication network 14. Thus, the remote computing devices 11 may access (e.g., read and/or write) various data blocks 28 stored in a memory module 24.

To facilitate improving access to stored data blocks 28, a memory module 24 may include a memory controller 30 that controls storage of data in its memory devices 26. In some embodiments, the memory controller 30 may operate based on circuit connections formed (e.g., programmed) in the memory controller 30. Thus, in such embodiments, the memory controller 30 may include one or more application specific integrated circuits (ASICs), one or more field programmable logic gate arrays (FPGAs), or any combination of suitable processing devices. In any case, as described above, a memory module 24 may include memory devices 26 that implement different memory types, for example, which provide varying tradeoffs between data access speed and data storage density. Thus, in such embodiments, the memory controller 30 may control data storage across multiple memory devices 26 to facilitate leveraging the various tradeoffs, for example, such that the memory module 24 provides fast data access speed as well as high data storage capacity.

Figure 2:
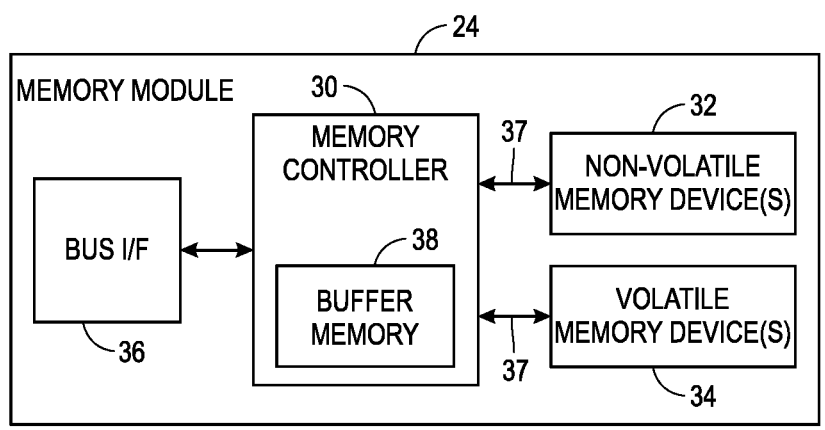
FIG. 2 is a block diagram of a memory module that may be implemented in a remote computing device of FIG. 1, in accordance with an embodiment.

To help illustrate, FIG. 2 depicts an example of a memory module 24 including different types of memory devices 26. In particular, the memory module 24 includes one or more non-volatile memory devices 32 and one or more volatile memory devices 34. In some embodiments, the volatile memory devices 34 may be implemented as dynamic random-access memory (DRAM) and/or static random-access memory (SRAM). In other words, in such embodiments, the memory module 24 may include one or more DRAM devices (e.g., chips or integrated circuits), one or more SRAM devices (e.g., chips or integrated circuits), or any combination of suitable memory devices.

Additionally, in some embodiments, the non-volatile memory devices 32 may be implemented as flash (e.g., NAND) memory, phase-change (e.g., 3D XPoint™) memory, and/or FeRAM. In other words, in such embodiments, the memory module 24 may include one or more NAND memory devices, one or more 3D XPoint™ memory devices, one or more FeRAM memory devices, or any combination of suitable memory devices. In fact, in some embodiments, the non-volatile memory devices 32 may provide storage class memory (SCM), which, at least in some instance, may facilitate reducing implementation associated cost, for example, by obviating other non-volatile data storage devices in the computing system 10.

In any case, in some embodiments, the memory module 24 may be implemented by disposing each of the non-volatile memory devices 32 and the volatile memory devices 34 on a flat (e.g., front and/or back) surface of a printed circuit board (PCB). To facilitate data communication via the data bus 25, the memory module 24 may include a bus interface 36 (bus I/F). For example, the bus interface 36 may include data pins (e.g., contacts) formed along an (e.g., bottom) edge of the printed circuit board. Thus, in some embodiments, the memory module 24 may be a single in-line memory module (SIMM), a dual in-line memory module (DIMM), or the like.

Additionally, in some embodiments, the bus interface 36 may include logic that enables the memory module 24 to communicate via a communication protocol implemented on the data bus 25. For example, the bus interface 36 may control timing of data output from the memory module 24 to the data bus 25 and/or interpret data input to the memory module 24 from the data bus 25 in accordance with the communication protocol. Thus, in some embodiments, the bus interface 36 may be a double data rate fourth-generation (DDR4) interface, a double data rate fifth-generation (DDR5) interface, a peripheral component interconnect express (PCIe) interface, a non-volatile dual in-line memory module (e.g., NVDIMM-P) interface, a cache coherent interconnect for accelerators (CCIX) interface, or the like.

In any case, as described above, a memory controller 30 may control data storage within the memory module 24, for example, to facilitate improving data access speed and/or data storage efficiency by leveraging the various tradeoffs provided by memory types implemented in the memory module 24. Thus, as in the depicted example, the memory controller 30 may be coupled between the bus interface 36 and the memory devices 26 via one or more internal buses 37, for example, provided as conductive traces formed on the printed circuit board. For example, the memory controller 30 may control whether a data block 28 is stored in the non-volatile memory devices 32 or in the volatile memory devices 34. In other words, the memory controller 30 may transfer a data block 28 from the non-volatile memory devices 32 into the volatile memory devices 34 or vice versa.

To facilitate data transfers, the memory controller 30 may include buffer memory 38, for example, to provide temporary data storage. In some embodiments, the buffer memory 38 may include static random-access memory (SRAM) and, thus, may provide faster data access speed compared to the volatile memory devices 34 and the non-volatile memory devices 32. The buffer memory 38 may be DRAM or FeRAM in some cases. Additionally, to facilitate accessing stored data blocks 28, the memory module 24 may include an address map and/or other parameters stored in the buffer memory 38, a non-volatile memory device 32, a volatile memory device 34, a dedicated address map memory device 26, or any combination thereof. The other parameters may include a physical experience table that stores parameters and/or data related to operation of the memory module 24 and/or one or more components of the computing system 10.

In addition, the remote computing device 11 may communicate with a service processor and/or a service bus included in or separate from the processing circuitry 22 and/or the data bus 25. The service processor, processing circuitry 22, and/or the memory controller 30 may perform error detection operations and/or error correction operations (ECC), and may be disposed external from the remote computing device 11 such that error detection and error correction operations may continue if power to the remote computing device 11 is lost. For simplicity of description, the operations of the service processor are described as being included in and performed by the memory controller 30, but it should be noted that in some embodiments the error correction operations or data recovery operations may be employed as functions performed by the service processor, processing circuitry 22, or additional processing circuitry located internal or external to the remote computing device 11 or the client device 12.

The memory module 24 is depicted in FIG. 2 as a single device that includes various components or submodules. In some examples, a remote computing device may include one or several discrete components equivalent to the various devices, modules, and components that make up the memory module 24. For instance, a remote computing device may include non-volatile memory, volatile memory, and a controller positioned on one or several different chips or substrates. In other words, the features and functions of the memory module 24 need not be employed in a single module to achieve the benefits described herein.

Figure 3:
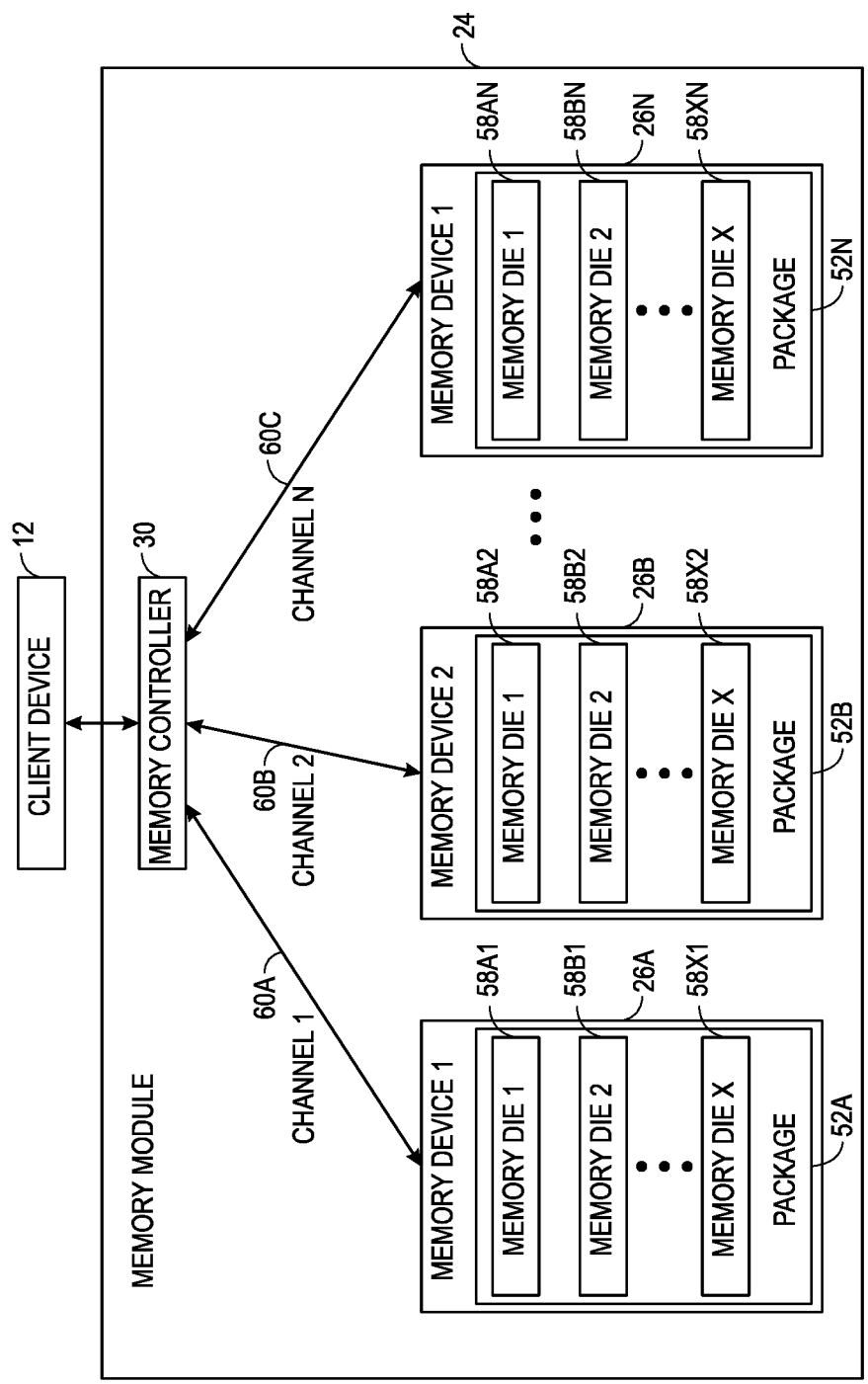
FIG. 3 is a block diagram of the memory module of FIG. 2, in accordance with an embodiment.

To help illustrate, FIG. 3 depicts an example of the memory module 24 that includes one or more of the memory devices 26 (e.g., up to an N number of memory devices 26), each including non-volatile or volatile memory infrastructure based on the particular application. Each memory device 26 may store a segment of data corresponding to a memory address in a package 52. A particular memory device 26 may include any number of memory die 58 (e.g., up to X number of memory die 58). The segment of data stored by the memory device 26 may be smaller than the overall size of the package 52. For example, the segment of data may be 512 bytes (B) while the entire package 52 may store several gigabytes. It should be appreciated that the depicted example is merely intended to be illustrative and not limiting.

In any case, with regard to the depicted embodiments shown in FIG. 3, the processing circuitry 22 and/or the memory controller 30 may facilitate communication between the memory devices 26 and the client device 12 via channels 60. Each memory device 26 stores a particular amount of data accessible to the client device 12 as a codeword, where a codeword is a subset of data read or written to the memory device 26 within a same memory operation.

Each memory die 58 may have a thermal limit that corresponds to a maximum number of data partitions that may be permitted to be written to during a data write operation of a codeword. The thermal limit may be a result from material properties of the memory die 58 and/or may be affected by operating temperatures of one or more components of the computing system 10, availability of ventilation, or the like. Write operations to the memory may produce a relatively large current (compared to read operations or idle operations), and different materials may withstand different amounts of current. Writing to a higher number of partitions of the memory die 58 may lead to higher amounts of current being applied to the memory die 58 such that the thermal limit of the memory die 58 is exceeded. The thermal limit may correspond to an over-temperature threshold number of partitions. Write operations that cause the memory controller 30 to write data to a number of partitions equal to or exceeding the over-temperature threshold may exceed the thermal threshold of the corresponding memory die 58, and thus the memory die 58 may over-heat, suffer from loss of stored data, performance may worsen or degrade, or the like.

However, the memory controller 30 may execute write operations with consideration of the over-temperature threshold. In this way, the memory controller 30 may analyze a size of a codeword associated with a write operation to determine how much of the codeword to store in each memory die 58 to avoid exceeding the over-temperature threshold number of partitions in any one respective memory die (e.g., a spread across partitions value, partition spread value). When the memory controller 30 operates with considerations of the over-temperature threshold, loss of stored data and other effects of memory die 58 over-temperature (e.g., over-heating) may be reduced or eliminated.

Figure 4:
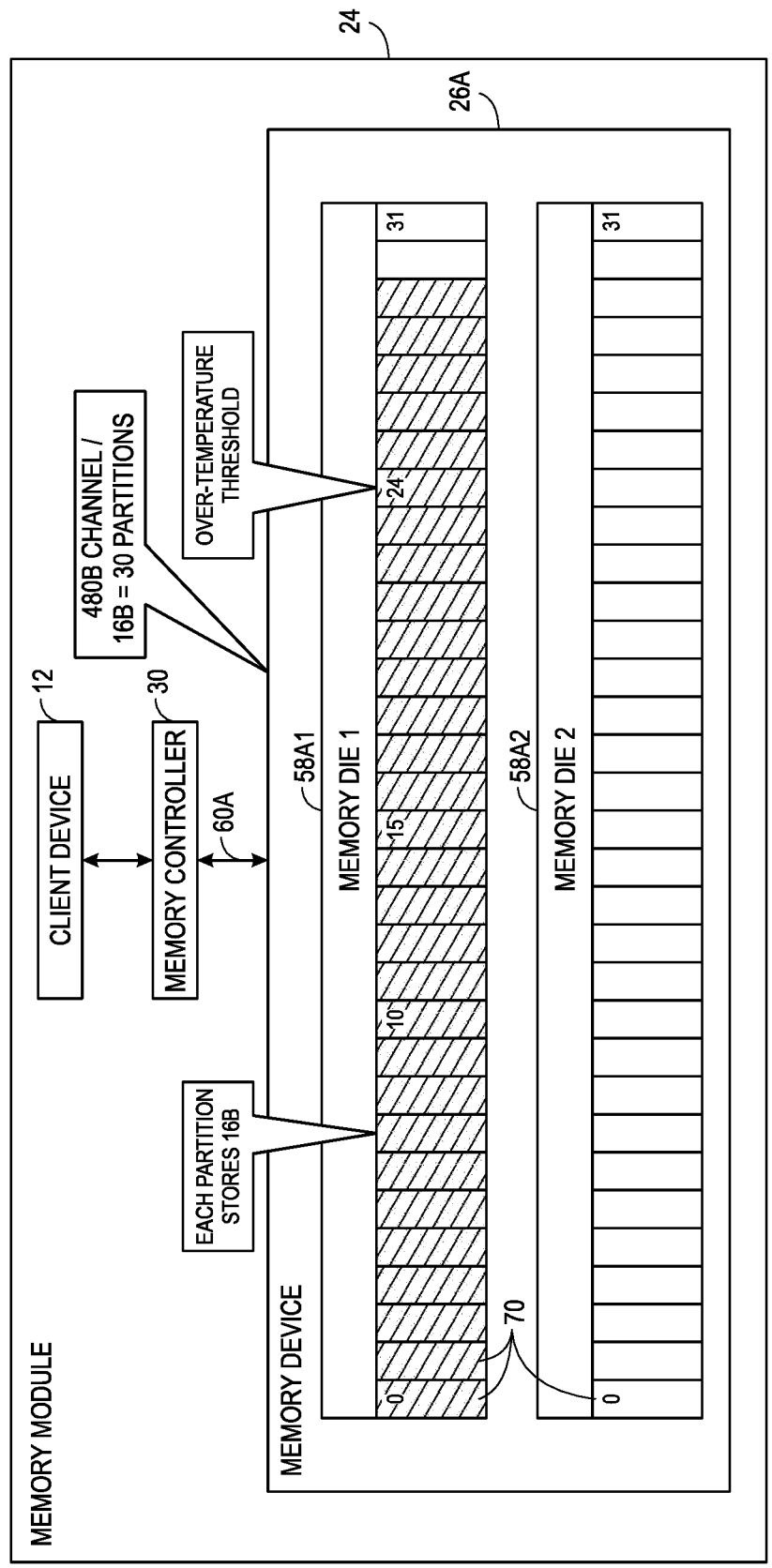
FIG. 4 is a block diagram of the memory module of FIG. 2 having data stored according to a first partition pattern, in accordance with an embodiment.

To help elaborate, FIG. 4 is a block diagram of the memory module 24. The memory module 24 is shown to have a codeword stored within its memory device 26A according to a first partition pattern. That is, data from a write operations is stored in the memory device 26A within the memory die 58A1 and none of the data is stored in the memory die 58A2. In this way, the number of partitions 70 and the number of memory die 58 used to store the data correspond to the particular partition pattern (e.g., 1 memory die 58A1 and 30 partitions 70).

As described above, the memory die 58A1 has a thermal limit. For example, the thermal limit of the memory die 58A1 may correspond to an over-temperature threshold equal to 25 partitions 70 (e.g., indicated by "24" since the partitions 70 may be referenced from 0). Since the codeword is stored into 30 of 32 partitions 70 of the memory die 58A1, and since 30 partitions 70 is greater than or equal to 25 partitions 70, the over-temperature threshold of the memory die 58A1 is exceeded and the memory die 58A1 may over-heat, suffer from loss of stored data, performance may worsen or degrade, or the like.

In accordance with the described embodiments, before storing the data of the write request into the memory die 58, the memory controller 30 may determine a partition pattern to follow to reduce or eliminate a chance of exceeding the thermal limit of each memory die 58, therefore improving operation of the memory system. In particular, the memory controller 30 may determine a total size (e.g., in bytes (B) and/or bits (b)) of the data to be written. The memory controller 30 may compare the data size to a channel size (e.g., in B and/or b) and a partition size (e.g., in B and/or b) to determine a suitable combination of partitions 70 across one or more memory die 58 within which to store the data. Once the memory controller 30 determines the partition pattern to use, the memory controller 30 may update one or more data addresses and/or commands to reflect the determined partition pattern and may operate to store the data according to the partition pattern.

For example, the memory controller 30 of FIG. 4 did not adjust the partition pattern based at least in part on the over-temperature threshold of the memory die 58A1. The memory controller 30 determined that the data to be written is the size of the channel 60A, and the size of the channel 60A equals 480 B. The memory controller 30 also determined that each partition 70 stores 16 B. Without consideration of the over-temperature threshold of the memory die 58A1, the memory controller 30 determined to store the data into 30 partitions 70 (e.g., 480 B divided by 16 B equals 30 partitions 70).

Figure 5:
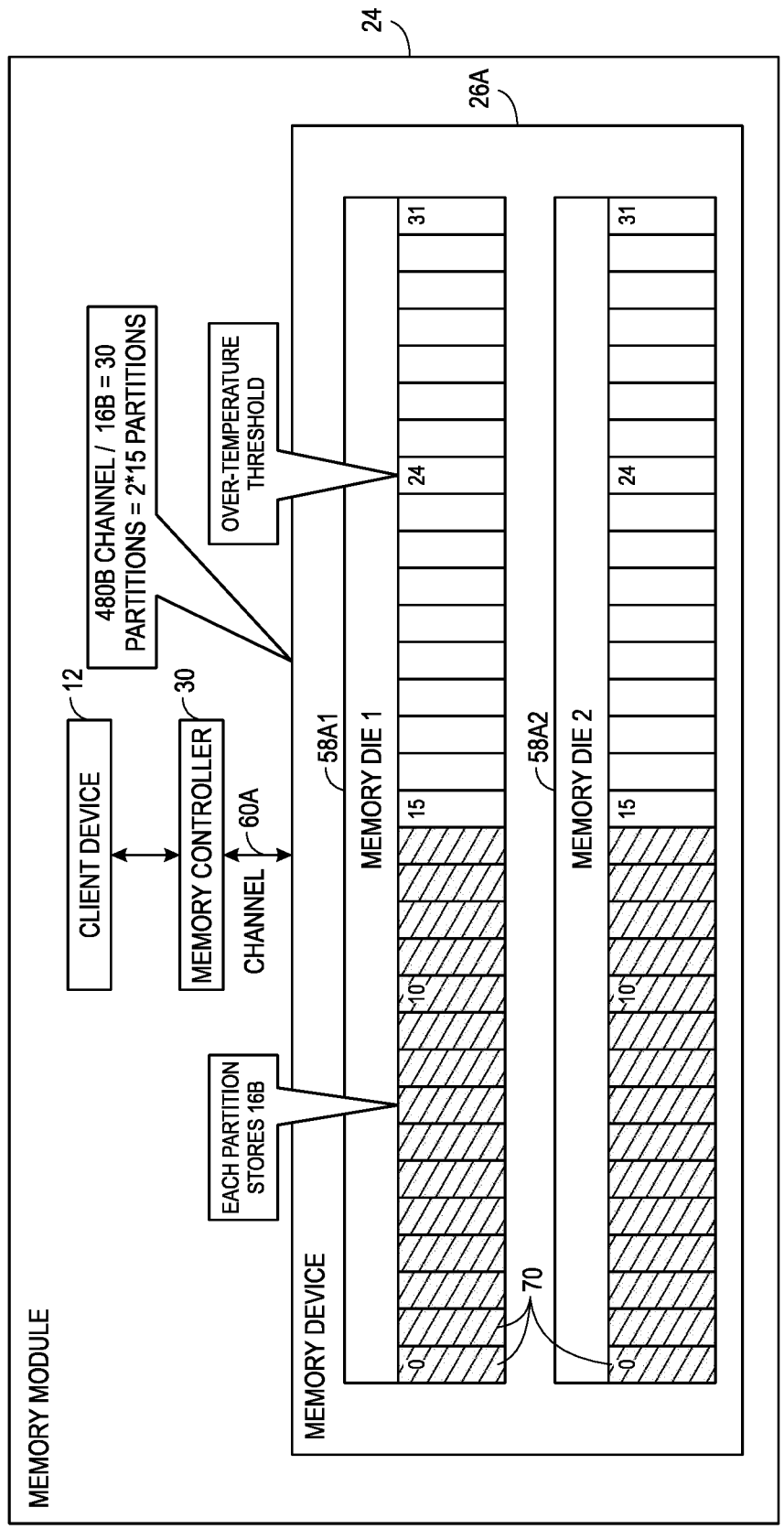
FIG. 5 is a block diagram of the memory module of FIG. 2 having data stored according to a second partition pattern, in accordance with an embodiment.

In contrast, the memory controller 30 of FIG. 5 does adjust the partition pattern based at least in part on the over-temperature threshold of the memory die 58A1 in accordance with the present embodiments. FIG. 5 is another block diagram of the memory module 24 communicatively coupled to a memory controller 30 that operates based at least in part on the over-temperature thresholds of the memory die 58. The memory module 24 is shown to have a codeword stored within its memory device 26A according to a second partition pattern. In this example, the memory controller 30 may determine the number of partitions 70 in a substantially similar or same way as the memory controller 30 of FIG. 4. However, the memory controller 30 of FIG. 5 may compare the number of partitions 70 to the respective over-temperature thresholds of each memory die 58 (e.g., memory die 58A1 and memory die 58A2) to determine whether the number of partitions 70 is compatible with each over-temperature threshold.

In this example, the memory controller 30 of FIG. 5 determines that 30 partitions 70 is greater than or equal to the over-temperature threshold equaling 25 partitions 70. In response to determining that the over-temperature threshold is exceeded or otherwise not satisfied, the memory controller 30 may change the partition pattern to make the number of partitions 70 of each memory die 58 used to store the data equal to or less than the respective over-temperature threshold of the memory die 58. As depicted, the memory controller 30 determined to store half of the codeword into the memory die 58A1 and the other half of the codeword into the memory die 58A2. In this way, the codeword occupies 15 partitions 70 in memory die 58A1 (e.g., 0 to 14, 0:14) and 15 partitions 70 in memory die 58A2 (e.g., 0 to 14, 0:14). Since no more than 25 partitions 70 are used in any one memory die 58, thermal limits of the respective memory die 58 are not exceeded.

Figure 6:
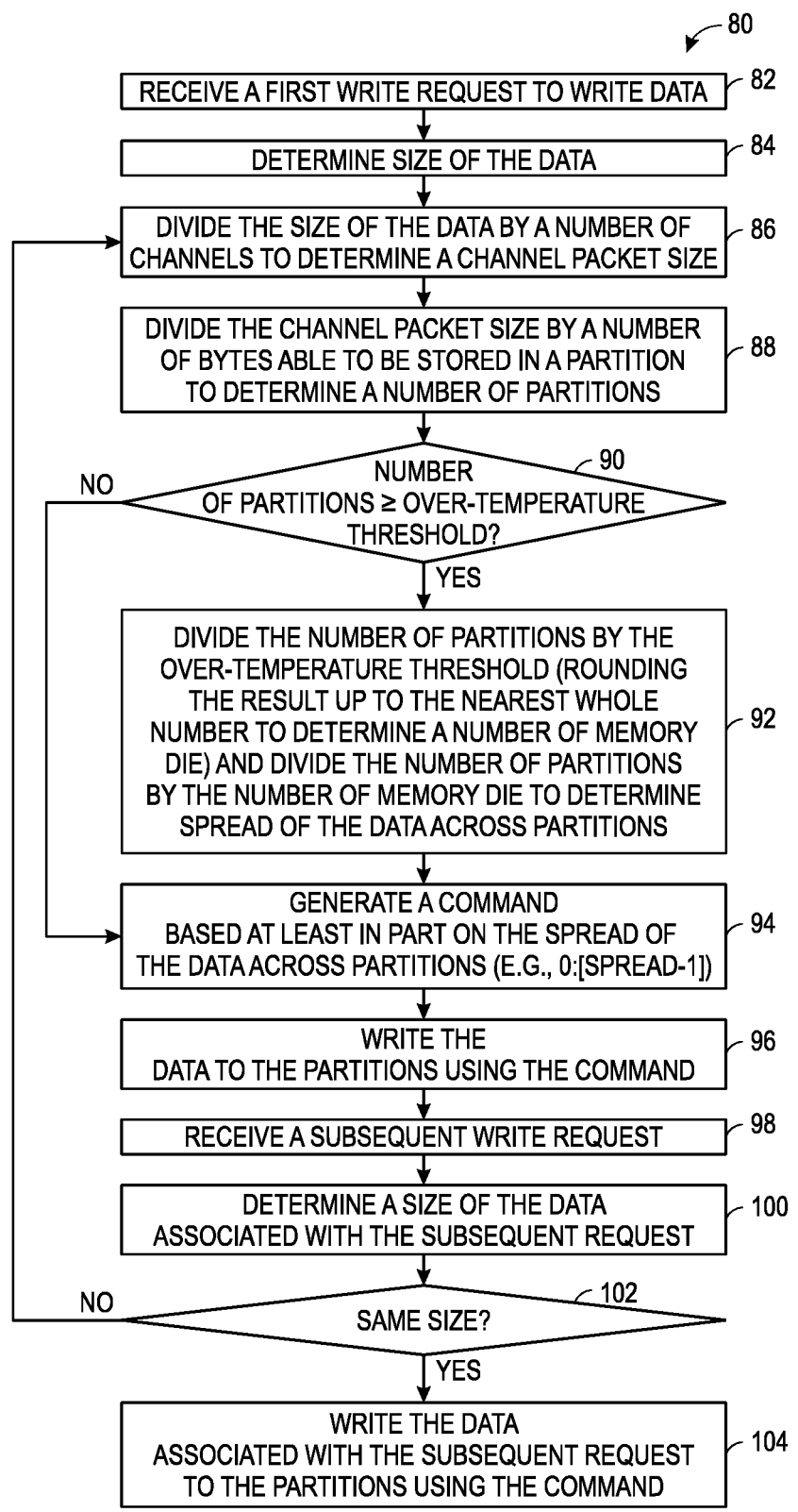
FIG. 6 is a flowchart of a process for determining a partition pattern for storing data within the memory module of FIG. 2, in accordance with an embodiment.

FIG. 6 is a flowchart of a process 80 for determining a partition pattern for storing data within the memory module 24 to mitigate the likelihood that over-temperature thresholds are reached. The memory controller 30 is described below as performing the process 80, but it should be understood that any suitable processing circuitry may additionally or alternatively perform the process 80. Furthermore, although the process 80 is described below as being performed in a particular order, it should be understood that any suitable order may be used to perform individual operations of the process 80.

Generally, the process 80 includes a memory controller receiving a first write request to write data (block 82), determining a size of the data (block 84), dividing the size of the data by a number of channels to determine a channel packet size (block 86), dividing the channel packet size by a number of bytes able to be stored in a partition to determine a number of partitions (block 88), and determining whether the number of partitions is greater than or equal to an over-temperature threshold (block 90). In response to the memory controller determining that the number of partitions is greater than the over-temperature threshold, the memory controller may proceed to divide the number of partitions by the number of die on a package to determine a spread of the data across the partitions (block 92) and generate a command based at least in part on the spread of the data across the partitions (e.g., 0.[spread-1]) (block 94). However, in response to the memory controller determining that the number of partitions is equal to or less than the over-temperature threshold, the memory controller may proceed to generate a command based at least in part on the spread of the data across the partitions (e.g., 0.[spread-1]) (block 94). After completion of operations at block 94, the memory controller may continue to perform the process 80 by writing the data to the partitions using the command (block 96), receiving a subsequent write request (block 98), determining a size of data associated with the subsequent write request (block 100), and determining whether the size of the data associated with the subsequent write request is the same size of the data determined at block 84 (block 102). In response to the memory controller determining that the size of the data associated with the subsequent write request is not the same size of the data determined at block 84, the memory controller may repeat the operations of the process 80 to determine a new command (e.g., at block 86). However, in response to the memory controller determining that the size of the data associated with the subsequent write request is the same size of the data determined at block 84, the memory controller may write the data associated with the subsequent write request to the partitions using the command (block 104).

In any case, as described above, the memory controller 30 may wait for a first write request (e.g., a first memory operation request) to perform a write operation from its client device 12 (block 82). The memory controller 30 may be idle, and not perform memory operations (e.g., read, write) in-between read or write access events (e.g., reading or writing operations) initiated by the client device 12.

In response to receiving the first write request to write data, the memory controller 30 may determine a size of the data (block 84). This operation may generate a numerical representation of the data size. For example, the memory controller 30 may generate a value (e.g., number) that indicates the size of the data be stored within one or more memory die 58.

The memory controller 30 may divide the size of the data (e.g., data size) by a number of channels 60 to determine a channel packet size (block 86). The memory controller 30 may divide the channel packet size by a number of bytes able to be stored in a partition 70 to determine a number of partitions 70 (block 88).

The memory controller 30 may compare the number of partitions 70 determined at block 88 to the over-temperature threshold of the memory die 58 (block 90). When the number of partitions 70 is equal to or less than the over-temperature threshold, the memory controller 30 may generate a command based at least in part on the spread of the data across the partitions 70. Since the number of partitions 70 that are to be used to store a portion of the data in one memory die 58 does not exceed the over-temperature threshold, and thus may not exceed the thermal limit, the memory controller 30 may use that number of partitions 70 as the spread of the data across the partitions 70 to generate the command. The command may reference the partitions 70 using a notation substantially similar or equal to "0.[spread-1]," or any other suitable referencing or indexing technique.

However, when the memory controller 30 compares the number of partitions 70 to the over-temperature threshold of the memory die 58 (block 90) and determines that the number of partitions 70 is equal to or greater than the over-temperature threshold of the memory die 58, the memory controller 30 may proceed to avoid reaching the over-temperature threshold by adjusting the partition pattern. For example, the memory controller 30 may divide the number of partitions 70 by the number of memory die 58 on a respective package 52 of the memory module 24 (block 92) to determine a new spread of the data across the partitions 70. Generally, when the number of partitions 70 exceeds or is equal to the over-temperature threshold, the memory controller 30 responds by adjusting the partition pattern and increasing a number of memory die used to store that channel's portion of the data to be stored in that memory module 24. When the new spread of the data is determined, the memory controller 30 may proceed to generate the command based at least in part on the spread of the data (e.g., the new data spread from block 92) across the partitions 70 (block 94). In some embodiments, the memory controller 30 may generate relatively more commands at block 94 when operations at block 92 are performed than when operations at block 92 are skipped since more memory die 58 are to be used in the memory operation.

In both cases, the memory controller 30 proceeds (from block 94) to write the data to the partitions using the commands (block 96). In this way, the memory controller 30 may use the commands to logically separate portions of the overall data for transmission into one or more channels 60 for storage into one or more partitions 70 associated with one or more memory die 58. During these memory operations, the memory controller 30 may receive a logical address from the host, may translate the logical address into a physical address indicative of where the corresponding data is to be stored (e.g., via commands generated at least at block 96) during writing operations based at least in part on considerations to thermal limits managed at least in part by over-heating thresholds for the memory die 58, and may operate to write the corresponding data based on a corresponding physical address.

While at least a portion of the process 80 is being performed, or while the memory controller 30 is idle after performing operations described at block 96, the memory controller 30 may receive a subsequent write request (e.g., second write request) to the first write request to write additional data (block 98). In response to receiving the subsequent write request, the memory controller 30 may determine a size of the data associated with the subsequent write request (block 100). Using the determined data size for the subsequent write request, the memory controller 30 may determine whether the determined data size is equal to the data size determined at block 84.

When the data sizes are equal, the memory controller 30 may use the same addresses and/or commands, and thus may not have to update the addresses and/or command (e.g., write command) to be compatible with a different number of partitions 70 and/or a different size of data. Thus, the memory controller 30 may overwrite the data associated with the subsequent write request to partitions 70 using the command (block 104). In some cases, the memory controller 30 may not want to overwrite the data and so the memory controller 30 may instead adjust the commands (e.g., perform minor adjustments to the commands) to store the similarly-sized data into complimentary partitions 70 of memory that take up the same amount of logical space but are otherwise offset in memory by a suitable amount to avoid overwriting operations. In general, the specific portion pattern may not be recalculated since the original data size is the same between the write requests.

However, when the data sizes are not equal, the memory controller 30 may repeat the determination of the partition pattern and update the command for the new data size. In this way, the memory controller may repeat the operations associated with dividing the size of the data by a number of channels 60 to determine a channel packet size (block 86). Although the process 80 is depicted as ending at block 104, it should be understood that the process may inherently repeat itself at block 98 by the memory controller 30 idling after block 104 until receiving another write request at block 98.

In some embodiments, a number of memory devices 26 fewer than a total number of memory devices 26 may be used in a memory operation. Thus, the number of channels 60 used in operations of block 86 may be dependent on other parameters. For example, the memory controller 30 may determine the number of channels 60 based on the determined size of the data at block 84, and thus may use generally fewer memory devices 26 for smaller write requests as long as thermal limits permit it. In this way, the memory controller 30 may additionally or alternatively operate to determine a size of the data (e.g., operations of block 84), divide the size of the data by the number of bytes able to be stored in a partition 70 to generate a total number of partitions 70, and may divide the total number of partitions 70 by the over-temperature threshold number of partitions 70 to determine a quantity of memory die 58 to be used to complete the write request. As an example, the memory controller 30 may receive a write request to write 3000 B to memory. The memory controller 30 may divide 3000 B by 16 B (e.g., number of bytes able to be stored in a partition) which equals 187.5 partitions 70 that are to be used to store the data of the write request. If each memory die 58 is to store no more than 24 partitions-worth of data (e.g., where 25 or more partitions 70 may exceed a thermal limit of a respective memory die 58 during the write operation), 187.5 partitions 70 divided by 24 equals about 7.8 memory die 58, rounding to 8 memory die 58, are to be used to complete the memory operation (e.g., where each memory die 58 are permitted to store a codeword equal to about 384 B to be stored across 24 partitions 70 or less, if the example over-temperature threshold of 24 partitions is to be observed). Since just eight memory die 58 are to be used in this writing operation, an example memory system (e.g., memory module 24) that includes more than eight memory die 58 may use a number of memory devices 26 fewer than a total number of memory devices 26.

It is noted that with the above-described example the number of memory die 58 (e.g., 7.8 memory die 58) was rounded up to 8 memory die 58. Thus, in some embodiments, a number of partitions 70 used on each memory die 58 may be unequal relative to the other memory die 58 used for a particular write operation. For example, 7 of the memory die 58 may store codewords in 24 partitions (e.g., for a total of 168 partitions used, leaving 187.5−168=19.5 partitions 70 to be accounted for). Thus, the eighth memory die 58 may store a codeword across 20 partitions 70, or a suitable number of partitions 70 to account for a remainder amount of partitions 70. In some embodiments, a subset of memory die 58 may store codewords in any suitable number of partitions 70 equal to or less than the over-temperature threshold number of partitions 70, which may be a different number of partitions 70 used to store codewords in a different subset of memory die 58 of the same write operation and/or between different write operations.

Thus, technical effects of the present disclosure include facilitating improved memory writing operations to protect against over-heating and/or loss of stored data at, at least, a die-level (e.g., since die-level performance issues may affect operation of the electronic device overall). These techniques describe systems and methods for adjusting partition patterns used when storing data across memory die with consideration to thermal limits represented via over-temperature thresholds of partitions. These techniques may also permit the memory controller to repeat use of a particular addressing command when data sizes between two or more transactions are equal.

With these technical effects in mind, multiple memory devices may be implemented on a memory module, thereby enabling the memory devices to be communicatively coupled to the processing circuitry as a unit. For example, a dual in-line memory module (DIMM) may include a printed circuit board (PCB) and multiple memory devices. Memory modules respond to commands from a memory controller communicatively coupled to a client device or a host device via a communication network. Or in some cases, a memory controller may be implemented on the host-side of a memory-host interface; for example, a processor, microcontroller, FPGA, ASIC, or the like may each include a memory controller. This communication network may enable data communication there between and, thus, the client device to utilize hardware resources accessible through the memory controller. Based at least in part on user input to the client device, processing circuitry of the memory controller may perform one or more operations to facilitate the retrieval or transmission of data between the client device and the memory devices. Data communicated between the client device and the memory devices may be used for a variety of purposes including, but not limited to, presentation of a visualization to a user through a graphical user interface (GUI) at the client device, processing operations, calculations, or the like. Thus, with this in mind, the above-described improvements to memory controller operations and memory writing operations may manifest as improvements in visualization quality (e.g., speed of rendering, quality of rendering), improvements in processing operations, improvements in calculations, or the like.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An apparatus, comprising:
    a plurality of memory devices, wherein each memory device of the plurality of memory devices comprises two or more memory die;
    a plurality of channels communicatively coupled to each memory device of the plurality of memory devices, wherein each channel of the plurality of channels are associated with one of the two or more memory die of each memory device; and
    a memory controller communicatively coupled to the plurality of channels, wherein the memory controller is configured to:
        receive a first write request associated with a first data packet;
        determine whether a number of partitions to store at least a portion of the first data packet is equal to or less than an over-temperature threshold number of partitions;
        in response to the number of partitions being greater than the over-temperature threshold number of partitions, adjust a partition pattern; and
        write the at least a portion of the first data packet into at least a subset of the plurality of memory devices based at least in part on the partition pattern.

2. The apparatus of claim 1, wherein the memory controller is configured to adjust the partition pattern at least in part by reducing a number of partitions used to write the at least a portion of the first data packet into a memory die of the plurality of memory devices.

3. The apparatus of claim 1, wherein the memory controller is configured to write the at least a portion of the first data packet into the plurality of memory devices at least in part by:
    generating a command based at least in part on the partition pattern, wherein the command is referenced during a logical address to a physical address conversion; and
    storing the at least a portion of the first data into the physical address based on the command.

4. The apparatus of claim 3, wherein the memory controller is configured to store the at least a portion of the first data packet into the physical address based on the command at least in part by storing a first subset of the at least a portion of the first data into the first memory die and by storing a second subset of the at least a portion of the first data into a second memory die of the two or more memory die.

5. The apparatus of claim 1, wherein the memory controller is configured to:
    receive a second write request associated with a second data packet;
    compare a size of the second data packet to a size of the first data packet; and
    in response to the size of the second data packet equaling the size of the first data packet, write the second data packet into the at least a subset of the plurality of memory devices based at least in part on the partition pattern.

6. The apparatus of claim 1, wherein the two or more memory die comprise at least one of flash memory, NAND memory, phase-change memory, 3D XPoint™ memory, or ferroelectric random access memory, or any combination thereof.

7. The apparatus of claim 1, wherein the memory controller is configured to:
    determine a size of the first data packet;
    divide the size by a number of the plurality of channels to generate a channel packet size; and
    divide the channel packet size by a size of data able to be stored in a respective partition to generate the number of partitions.

8. The apparatus of claim 1, wherein the memory controller is configured to:
    receive a second write request associated with a second data packet;
    compare a size of the second data packet to a size of the first data packet; and in response to the size of the second data packet not equaling the size of the first data packet, repeat a determination of the partition pattern to generate a new partition pattern; and write the second data packet based at least in part on the new partition pattern instead of the partition pattern corresponding to the first data packet.

9. The apparatus of claim 1, wherein the partition pattern is configured to indicate a range of partitions and a number of memory die that the at least a portion of the first data packet is to be stored within a respective memory device of the plurality of memory devices.

10. A method, comprising:

receiving a first write request from a client device, wherein the first write request is associated with a first data packet;

determining whether a number of partitions to store at least a portion of the first data packet is equal to or less than an over-temperature threshold number of partitions for a first memory die;

in response to the number of partitions being greater than the over-temperature threshold number of partitions, adjusting a partition pattern such that a first subset of the at least a portion of the first data packet is stored on the first memory die and a second subset of the at least a portion of the first data packet is stored on a second memory die; and writing the first data packet into a plurality of memory die based at least in part on the partition pattern, wherein the plurality of memory die comprises the first memory die and the second memory die.

11. The method of claim 10, comprising:

receiving a second write request associated with a second data packet;

comparing a size of the second data packet to a size of the first data packet; and in response to the size of the second data packet not equaling the size of the first data packet, adjusting the partition pattern to generate an additional partition pattern; and writing the second data packet based at least in part on the additional partition pattern instead of the partition pattern corresponding to the first data packet.

12. The method of claim 10, comprising:

determining a size of the first data packet;

dividing the size by a number of channels to generate a channel packet size, wherein the number of channels equals at least a number of memory devices that comprise subsets of the plurality of memory die; and dividing the channel packet size by a size of data able to be stored in a partition to generate the number of partitions.

13. The method of claim 10, wherein adjusting the partition pattern comprises reducing a respective number of partitions used to store the first subset of the at least a portion of the first data packet on the first memory die and the second subset of the at least a portion of the first data packet on the second memory die.

14. The method of claim 10, wherein adjusting the partition pattern comprises:

reducing a first respective number of partitions used to store the first subset of the at least a portion of the first data packet on the first memory die; and reducing a second respective number of partitions used to store the second subset of the at least a portion of the first data packet on the second memory die, wherein the first respective number of partitions is equal to or less than the second respective number of partitions.

15. The method of claim 10, wherein adjusting the partition pattern comprises reducing a respective number of partitions to a number of partitions less than the over-temperature threshold number of partitions, wherein the respective number of partitions are used to store at least the first subset of the at least a portion of the first data packet on the first memory die.

* * * * *